United States Patent
Evanchik et al.

(10) Patent No.: US 7,543,123 B2
(45) Date of Patent: Jun. 2, 2009

(54) MULTISTAGE VIRTUAL MEMORY PAGING SYSTEM

(75) Inventors: Stephen A. Evanchik, Malden, MA (US); Louis M. Weitzman, Brookline, MA (US)

(73) Assignee: International Business Machines Corporation, Armonk, NY (US)

( * ) Notice: Subject to any disclaimer, the term of this patent is extended or adjusted under 35 U.S.C. 154(b) by 215 days.

(21) Appl. No.: 11/268,075

(22) Filed: Nov. 7, 2005

(65) Prior Publication Data

US 2007/0106853 A1 May 10, 2007

(51) Int. Cl.
G06F 12/12 (2006.01)
(52) U.S. Cl. .................... 711/159; 711/119; 711/133; 711/156
(58) Field of Classification Search .......... 711/118, 711/119, 122, 133, 136, 159, 160
See application file for complete search history.

(56) References Cited

U.S. PATENT DOCUMENTS

| | | | |
|---|---|---|---|
| 5,390,334 A | 2/1995 | Harrison | 395/750 |
| 5,732,238 A | 3/1998 | Sarkozy | 395/440 |
| 5,778,443 A * | 7/1998 | Swanberg et al. | 711/162 |
| 5,893,135 A | 4/1999 | Hasbun et al. | 711/103 |
| 6,438,668 B1 | 8/2002 | Esfahani et al. | 711/165 |
| 2002/0091905 A1 | 7/2002 | Geiger et al. | 711/170 |
| 2002/0188815 A1 | 12/2002 | Wang et al. | 711/162 |
| 2003/0221062 A1 * | 11/2003 | Shimada | 711/114 |
| 2005/0097084 A1 | 5/2005 | Balmin et al. | 707/3 |
| 2007/0050548 A1 * | 3/2007 | Bali et al. | 711/118 |
| 2007/0174574 A1 * | 7/2007 | Kano | 711/165 |

* cited by examiner

*Primary Examiner*—Hetul Patel
(74) *Attorney, Agent, or Firm*—John E. Campbell

(57) ABSTRACT

A computer implemented hierarchical method for paging data, when evicting a page of data from the computer system main storage, evicting the page to a first paging store (preferably NVRAM). When evicting a page of data from the first paging store, evicting the page to a second paging store (such as a disk). When the main store requires a page of data that is not in the main store and when the page of data is available in the first paging store, loading the third page of data into main store from first paging store. When the page of data is not available in the first paging store, loading the third page of data into main store from the second store. Optionally, pages of main store are saved and restored from NVRAM during a power-down, power-up sequence of events.

11 Claims, 8 Drawing Sheets

MULTISTAGE VIRTUAL MEMORY PAGING SYSTEM

FIELD OF THE INVENTION

The present invention relates to the field of computer virtual storage, and more particularly to managing movement of pages of data between levels of storage.

BACKGROUND OF THE INVENTION

Computer systems comprising one or more processors in communication with primary storage often called "main memory" or "main store" execute programs and manipulate data residing in main store. Computer systems compensate for the small amount off main store by providing virtual store wherein data containers, called "pages" of the virtual store are backed in a "page file" on a hard disk drive. In order to make the virtual store available to the processor, current pages of virtual store are backed by pages of main store accessible to the processor. As main memory fills up, pages are pushed out of main memory and, if modified, saved in the secondary storage system for later retrieval if necessary. If the page has not been modified only the reference to the page is updated to reflect that it is located on the secondary store. This process is called "page swapping" and if it is frequent, a serious degradation of performance ensues. A "page fault" occurs when a page is requested by the operating system or application that is not resident in the processor's main memory (main store). Typical solutions to this problem include better, more advanced algorithms for memory management and more simply increasing the amount of main memory available to the processor.

Serving pages out of the hard disk page file degrades system performance, especially with mobile devices where power conservation is important. Current mobile devices with hard disk drives suffer the most from the traditional virtual memory system. Disk drives in the present specification will be used to refer to a variety of permanent storage devices including but not limited to mechanically operated magnetic storage devices (disks, tapes), CD's, DVD's and the like. Mobile devices conserve power by shutting off unneeded components of the system. During long periods of disk inactivity, the hard disk drive may be powered off to prolong disconnected operation and conserver battery power. If a page fault occurs when the drive is powered off a noticeable delay ensues while the old page is "paged out" to the drive or while the new page is loaded from the drive in addition to the increased power consumption. Mechanical permanent store is slow even when powered on in that there is considerable mechanical delay in seeking the page to be loaded. If a page is frequently paged, the performance effect of waiting for a mechanical disk to power up or just to seek the page is more keenly felt.

U.S. Pat. No. 6,438,668: "Method and apparatus for reducing power consumption in a digital processing system" filed Sep. 30, 2002 incorporated herein by reference, discusses methods and apparatuses for controlling power consumption in a digital processing system. In one aspect of the invention, an exemplary method includes using a non-volatile memory of the digital processing system (DPS) as a virtual memory of a volatile random access memory (RAM) of the DPS, determining a selection of a reduced power consumption state, storing, in response to the selection and through a virtual memory process, data from the volatile RAM to the non-volatile memory, and reducing power to at least one element of the data processing system after the storing, wherein the storing includes determining whether to store the data to the non-volatile memory by determining if first data previously stored as virtual memory in the non-volatile memory is valid (not dirty) after the selection.

U.S. Pat. No. 5,778,443: "Method and apparatus for conserving power and system resources in a computer system employing a virtual memory" filed Dec. 14, 1994 incorporated herein by reference discloses a computer system that has volatile random access memory ("RAM") and nonvolatile auxiliary storage, a virtual memory operating system with some pages of virtual memory resident in RAM and other pages resident in a paging space in auxiliary storage. A time varying operating state for the computer is definable by reference to contents of the memory. A space in auxiliary storage (a "hibernation space") is allocated for storing a portion of RAM as a hibernation image. A first group of the RAM-resident virtual memory pages is stored in the paging space. A second group of the RAM-resident virtual memory pages is stored in the hibernation space. A hibernation state is entered where the computer system is powered off with the system at a certain operating state. The computer system is returned to operation at the certain operating state, which includes powering on the computer system and reading the second group of pages into the RAM.

U.S. Pat. No. 5,732,238: "Non-volatile cache for providing data integrity in operation with a volatile demand paging cache in a data storage system" filed Jun. 12, 1996 incorporated herein by reference discloses a non-volatile cache mechanism connected to a bus connected for conducting write addresses and data from a host computer to mass storage devices and to a volatile cache wherein each write operation includes a write address and at least one data word. The non-volatile cache mechanism includes a non-volatile memory constructed of a plurality of sub-memories having overlapping read/write cycles for storing the data words, a cache control responsive to the write operations for writing the data words into the nonvolatile memory in parallel with receipt of the data words into the volatile cache, and a cache index for storing index entries relating write addresses of write operations on the bus with corresponding storage addresses of the data words in the non-volatile memory. The cache control is responsive to a write operation for reading the index entries to identify and select at least one available storage address in the non-volatile memory, generating at least one index entry relating the write address of the current write operation and the selected storage addresses in the non-volatile memory, and writing the data words into the non-volatile memory. The cache control is responsive to flush addresses to the volatile cache for indexing the cache index to identify cache entries corresponding to the flush addresses and invalidating the corresponding cache entries.

U.S. Pat. No. 5,390,334: "Workstation power management by page placement control" filed Nov. 09, 1992 incorporated herein by reference discloses a power conserving method and apparatus for managing a computer memory. A first memory bank comprises normal RAM. A second memory bank comprises low-power RAM. More frequently used virtual pages are mapped onto the first memory bank while less frequently used virtual pages are mapped onto the second memory bank. Further power savings are achieved by removing power from the driver circuits of the memory controller for the second memory bank when the second memory bank is not being referenced.

Performance degradation due to traditional paging of data between permanent store and system main memory particularly in mobile devices adversely effects the usefulness of the computer system. A method is needed to improve paging performance.

SUMMARY OF THE INVENTION

According to the present invention, an additional step in the virtual memory system is provided using an intermediate, non-volatile random access memory (NVRAM) backed page file as a store for holding pages evicted main memory. The NVRAM backed page file is structured in a simple format comprising a directory and a page storage area. The directory is used to record where a page is stored in the page storage area of the NVRAM. Prior to accessing or storing a page in the NVRAM page file, the directory must be consulted to locate the requested page or locate available space to store the page. When a page must be swapped out of main memory, it is placed in the NVRAM page file which is significantly faster than the page file located on a permanent store, such as a hard disk drive. If the NVRAM page file is full, then a page is pushed out from the NVRAM page file to the hard disk backed page file in favor of the recently displaced page from main memory. If a page is absent from main memory, the system searches first in the NVRAM page file and then in the hard disk page file. Serving pages out of the NVRAM is faster and requires less power than serving them out of the hard disk page file, especially with mobile devices where power conservation is important. Current mobile devices with hard disk drives suffer the most from the traditional virtual memory system. Mobile devices conserve power by shutting off unneeded components of the system. During long periods of disk inactivity, the hard disk drive may be powered off to prolong disconnected operation. If a page located on the hard disk backed page file is needed when the drive is powered off a noticeable delay ensues while the page is loaded from the drive in addition to the increased power consumption. An NVRAM approach to virtual memory is very beneficial to long disconnected operation of a mobile device and its responsiveness.

It is therefore an object of the present invention to make a determination that a first page of data is to be evicted from main store of a computer system wherein when evicting the first page of data from the main store, storing the evicted first page in a first paging store, when evicting a second page of data from the first paging store, storing the evicted second page in a second store, when the main store requires a third page of data that is not in the main store and when the third page of data is available in the first paging store, loading the third page of data into main store from first paging store, and when the main store requires the third page of data that is not in main store and when the third page of data is not available in the first paging store, loading the third page of data into main store from the second store.

It is another object of the invention to provide any one of the first paging store or the second store consisting of any one of a non-volatile random access memory (NVRAM), a volatile random access memory or a permanent store wherein the permanent store comprises any one of a hard disk, CD, DVD or magnetic tape.

It is yet another object of the invention to provide the first paging store as a non-volatile random access memory (NVRAM) and the second store as a permanent store wherein the permanent store is a mechanically actuated storage device comprising any one of a hard disk, CD, DVD or magnetic tape.

It is still another object of the invention to, when it is determined that the second page of data in the first paging store is to be evicted from the first paging store to make room in the first paging store for the first page of data being evicted from main store.

It is yet another object of the invention when evicting a fourth page of data from main store, determining that the fourth page of data should be evicted to the second store and then storing the fourth page of data in the second store.

It is another object of the invention to upon determination that a first page of data is to be evicted from main store of a computer system to either determine to discard the evicted first page of data, to determine to store the evicted first page of data in the first paging store, or determine to store the evicted first page of data in the second store.

It is still another object of the invention when it is determined that a first page of data is to be evicted from main store of a computer system to either determine to discard the evicted second page of data, or to determine to store the evicted second page of data in the second store.

It is another object of the invention when it is determined that a first page of data is to be evicted from main store of a computer system, determining if the first page has been modified since it was loaded from the second store, when the first page is determined to be modified, determining to discard the evicted second page of data, and when the first page is determined to be un-modified, determining to store the evicted second page of data in the second store.

It is another object of the invention when it is determined that a first page of data is to be evicted from main store of a computer system to determine to evict the second page from the first paging store according to any one of a Least Recently Used algorithm (LRU), a First In First Out algorithm (FIFO) or a hashing algorithm.

It is yet another object of the invention wherein the first paging store is NVRAM when a power-down event is detected, to evict a plurality of pages of data from main store to NVRAM first paging store, when the plurality of pages of data have been evicted, proceeding to power down.

It is another object of the invention when a power-up event is detected, to load a plurality of pages of data from the NVRAM first paging store to main store, and when the plurality of pages of data have been loaded, completing the power-up event.

Additional features and advantages are realized through the techniques of the present invention. Other embodiments and aspects of the invention are described in detail herein and are considered a part of the claimed invention. For a better understanding of the invention with advantages and features, refer to the description and to the drawings.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

The detailed description explains the preferred embodiments of the invention, together with advantages and features, by way of example with reference to the drawings.

DESCRIPTION OF PREFERED EMBODIMENTS

Figure 1:
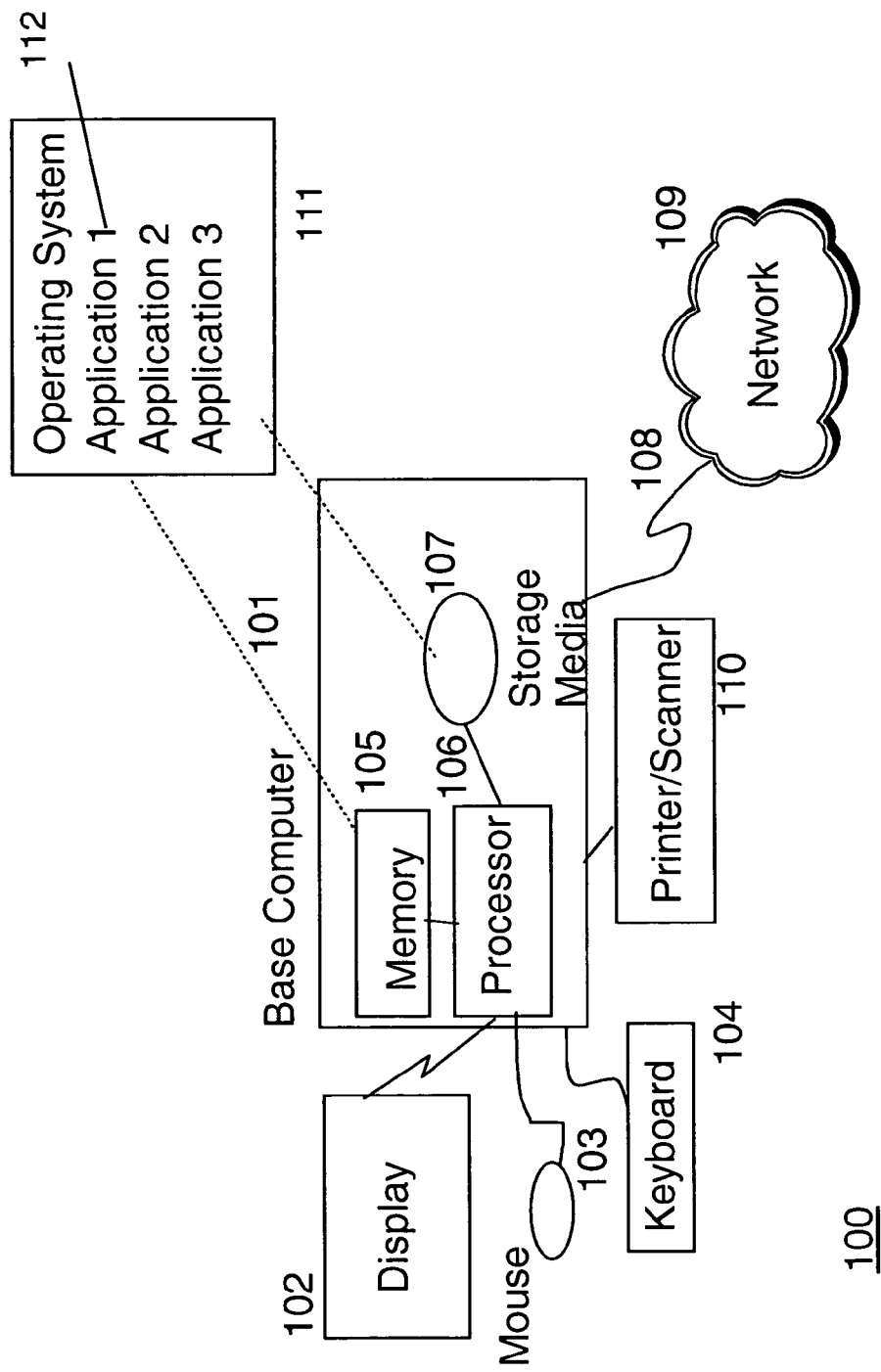
FIG. 1 is a diagram depicting components of a prior art computer system.

FIG. 1 illustrates a representative workstation or server hardware system in which the present invention may be practiced. The system 100 of FIG. 1 comprises a representative computer system 101, such as a personal computer, a workstation or a server, including optional peripheral devices. The workstation 101 includes one or more processors 106 and a bus employed to connect and enable communication between the processor(s) 106 and the other components of the system 101 in accordance with known techniques. The bus connects the processor 106 to memory 105 and long-term storage 107 which can include a hard drive, diskette drive or tape drive for example. The system 101 might also include a user interface adapter, which connects the microprocessor 106 via the bus to one or more interface devices, such as a keyboard 104, mouse 103, a Printer/scanner 110 and/or other interface devices, which can be any user interface device, such as a touch sensitive screen, digitized entry pad, etc. The bus also connects a display device 102, such as an LCD screen or monitor, to the microprocessor 106 via a display adapter.

The system 101 may communicate with other computers or networks of computers by way of a network adapter capable of communicating with a network 109. Example network adapters are communications channels, token ring, Ethernet or modems. Alternatively, the workstation 101 may communicate using a wireless interface, such as a CDPD (cellular digital packet data) card. The workstation 101 may be associated with such other computers in a Local Area Network (LAN) or a Wide Area Network (WAN), or the workstation 101 can be a client in a client/server arrangement with another computer, etc. All of these configurations, as well as the appropriate communications hardware and software, are known in the art.

Figure 2:
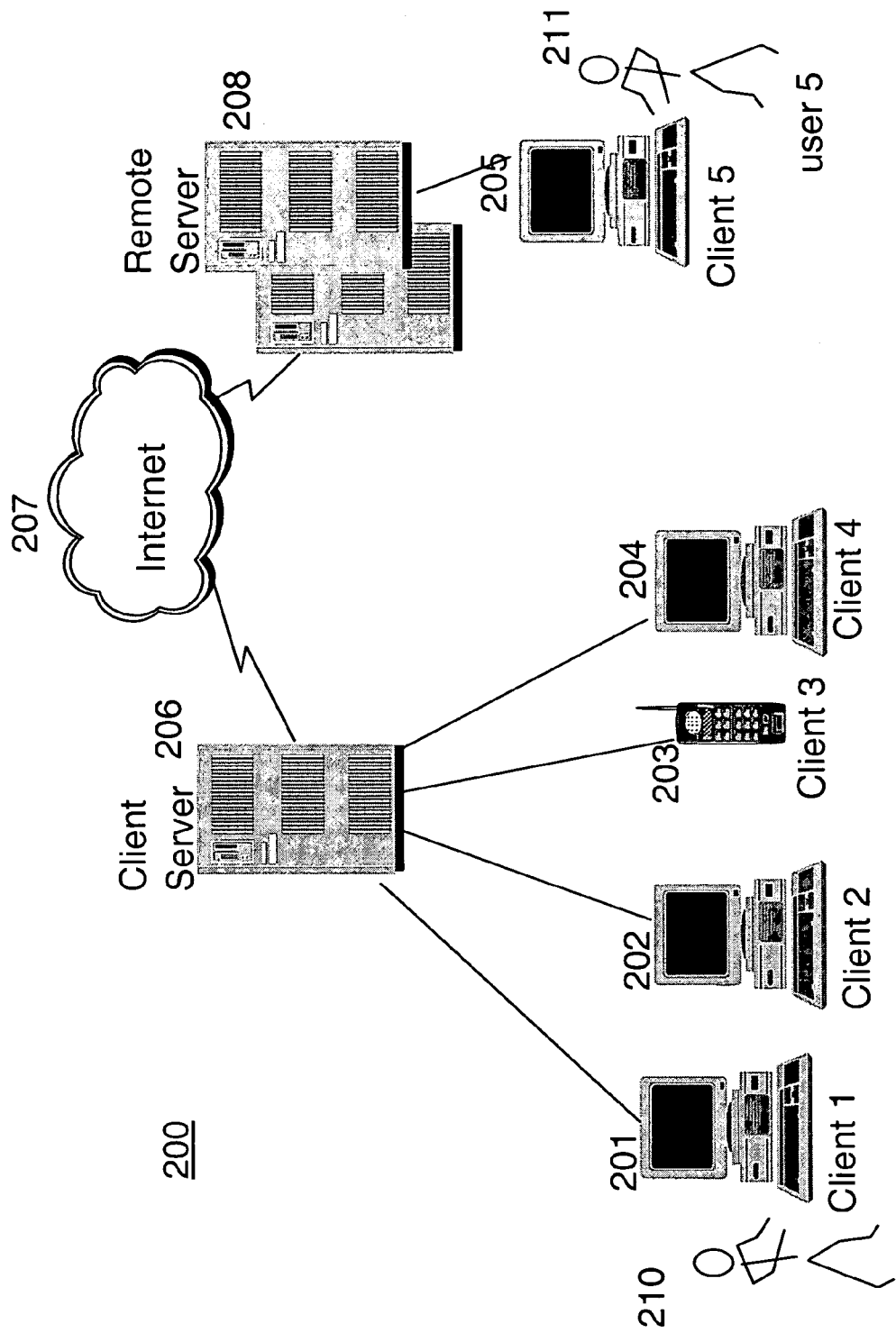
FIG. 2 is a diagram depicting a network of prior art computer systems.

FIG. 2 illustrates a data processing network 200 in which the present invention may be practiced. The data processing network 200 may include a plurality of individual networks, such as a wireless network and a wired network, each of which may include a plurality of individual workstations 101. Additionally, as those skilled in the art will appreciate, one or more LANs may be included, where a LAN may comprise a plurality of intelligent workstations coupled to a host processor.

Still referring to FIG. 2, the networks may also include mainframe computers or servers, such as a gateway computer (client server 206) or application server (remote server 208 which may access a data repository). A gateway computer 206 serves as a point of entry into each network 207. A gateway is needed when connecting one networking protocol to another. The gateway 206 may be preferably coupled to another network (the Internet 207 for example) by means of a communications link. The gateway 206 may also be directly coupled to one or more workstations 101 using a communications link. The gateway computer may be implemented utilizing an IBM eServer zSeries® 900 Server available from IBM Corp.

Software programming code of the present invention is preferably deployed to servers and clients by way of the interconnected networks or by way of portable media such as CDs or magnetic tape. The networks comprise either wire (including fiber optic cable) or wireless networks. A server preferably deploys code to other servers or directly to clients.

Software programming code which embodies the present invention is typically accessed by the processor 106 of the system 101 from long-term storage media 107, such as a CD-ROM drive or hard drive. The software programming code may be embodied on any of a variety of known media for use with a data processing system, such as a diskette, hard drive, or CD-ROM. The code may be distributed on such media, or may be distributed to users from the memory or storage of one computer system over a network to other computer systems for use by users of such other systems.

Alternatively, the programming code 111 may be embodied in the memory 105, and accessed by the processor 106 using the processor bus. Such programming code includes an operating system which controls the function and interaction of the various computer components and one or more application programs. Program code is normally paged from dense storage media 107 to high-speed memory 105 where it is available for processing by the processor 106. The techniques and methods for embodying software programming code in memory, on physical media, and/or distributing software code via networks are well known and will not be further discussed herein.

In the following detailed description, of the present invention, numerous specific details are set forth in order to provide a thorough understanding of the present invention. However, it will be obvious to one skilled in the art that the present invention may be practiced without these specific details. In other instances well known methods, procedures, components, and circuits have not been described in detail as not to unnecessarily obscure aspects of the present invention.

Some portions of the detailed descriptions which follow are presented in terms of procedures, logic blocks, processing, and other symbolic representations of operations on data bits within a computer memory. These descriptions and representations are the means used by those skilled in the data processing arts to most effectively convey the substance of their work to others skilled in the art. A procedure, logic block, process, step, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Figure 3A:
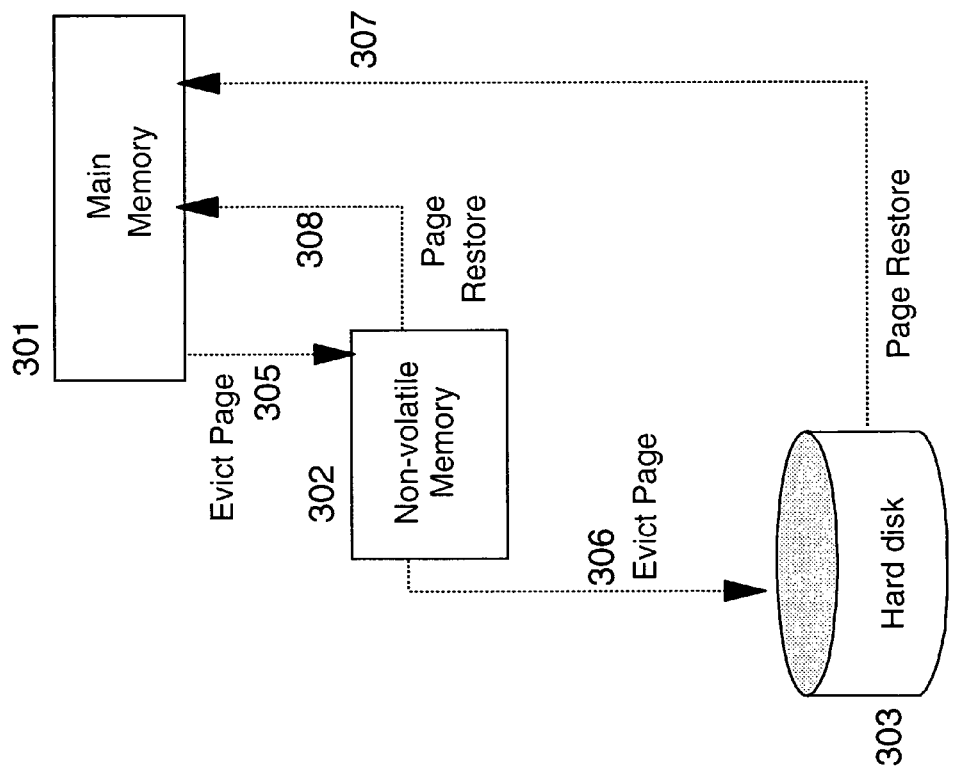
FIGS. 3A and 3B are diagrams depicting the conceptual data path a page follows.

FIG. 3 illustrates an example embodiment of a page replacement strategy according to the present invention. A device comprising a processor, a main memory, an NVRAM and a permanent store (disk drive) incorporates a memory hierarchy. The processor executes program instructions and operates on data in main memory. The processor Operating System (OS) manages virtual addresses and facilitates paging pages of virtual memory between main memory and NVRAM and permanent store. Preferably, pages evicted from main memory are paged to NVRAM. While the device is operating, the flow of evicted pages is from main memory 301 to non-volatile memory 302 by way of an eviction process 305 and then preferably a page from non-volatile memory to the hard disk 303 by way of the eviction process 306. If the missing page is located in non-volatile memory 302 then the page is restored 308 to main memory 301 from the non-volatile memory 302. If the missing page is not in the non-volatile memory but is located in the hard disk 303 then the page is restored 307 to main memory 301 directly from the hard disk 303.

Figure 3B:
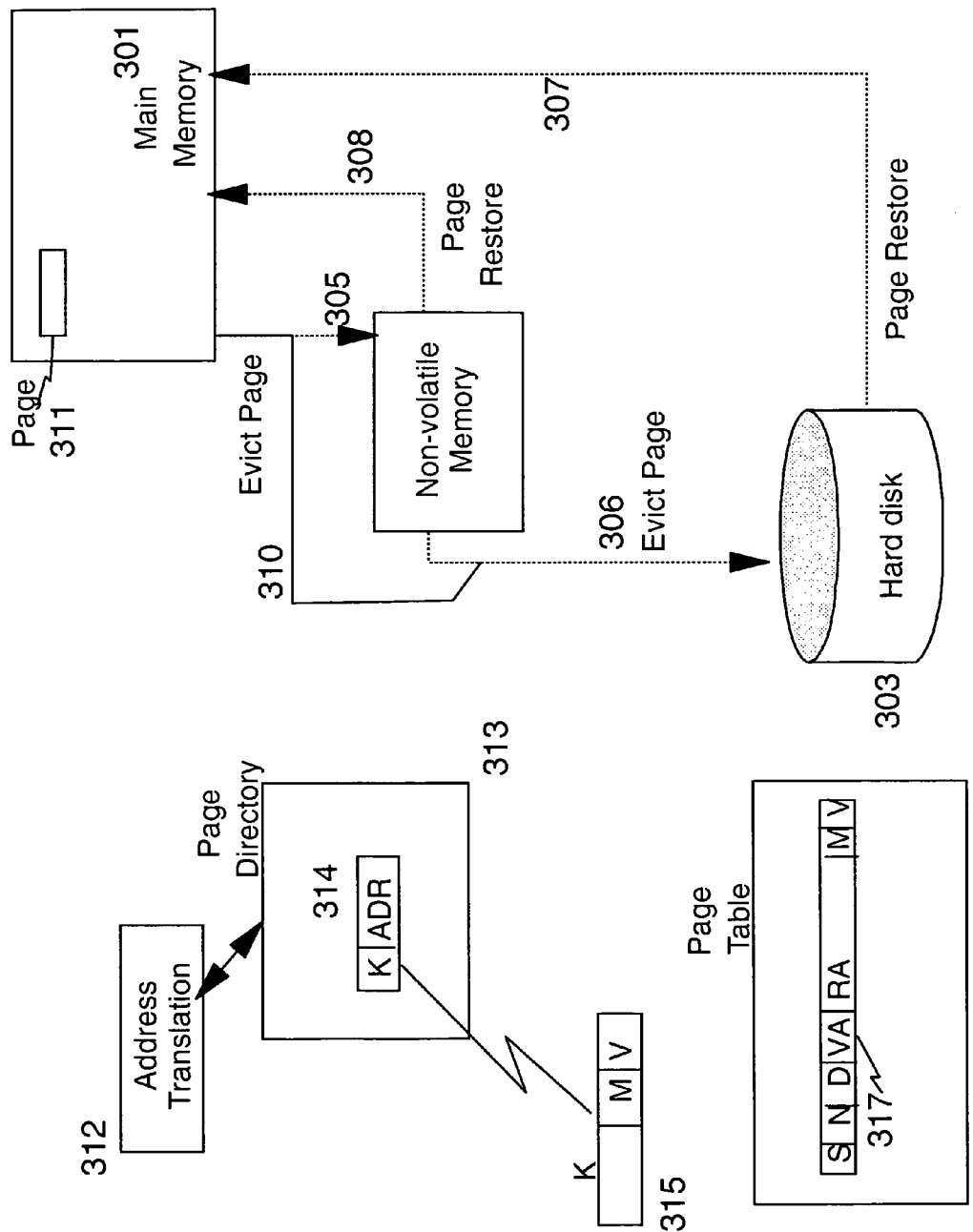

FIG. 3B provides an optional path for evicting pages 311 from main memory 301 directly to hard disk 303. In an embodiment, an address translation mechanism 312 accesses a page directory 313 holding entries 314 comprising a key (K) field 315 and the address of a virtual memory page (if resident) in main store 301. The K field comprises a modified field M and a valid field V. The valid field indicates whether or not the entry 314 points to a page 311 resident in memory 301. The M field indicates whether the page 311 in memory 301 has been modified while resident in memory.

The page table 316 comprises information about the location of the page. An entry 317 in the page table 316 preferably comprises an "S" field indicating if the page is in main store, an "N" field indicating if the page is in NVRAM and a "D" field indicating if the page is on hard disk. In an embodiment, each field ("S", "N", "D") additionally includes an indicator of if the page of the associated store has been modified, optionally there is a single modified indicator "M" indicating the page has been modified. Preferably the entry 317 includes a valid bit "V" indicating the entry 317 contents are valid. Preferably, the page table 316 comprises a directory of addresses for locating pages in the NVRAM and the page table 316 itself is preferably resident in NVRAM 305. An entry 317 preferably provides a virtual address "VA" and a real address "RA" for locating the corresponding page in NVRAM.

Figure 4:
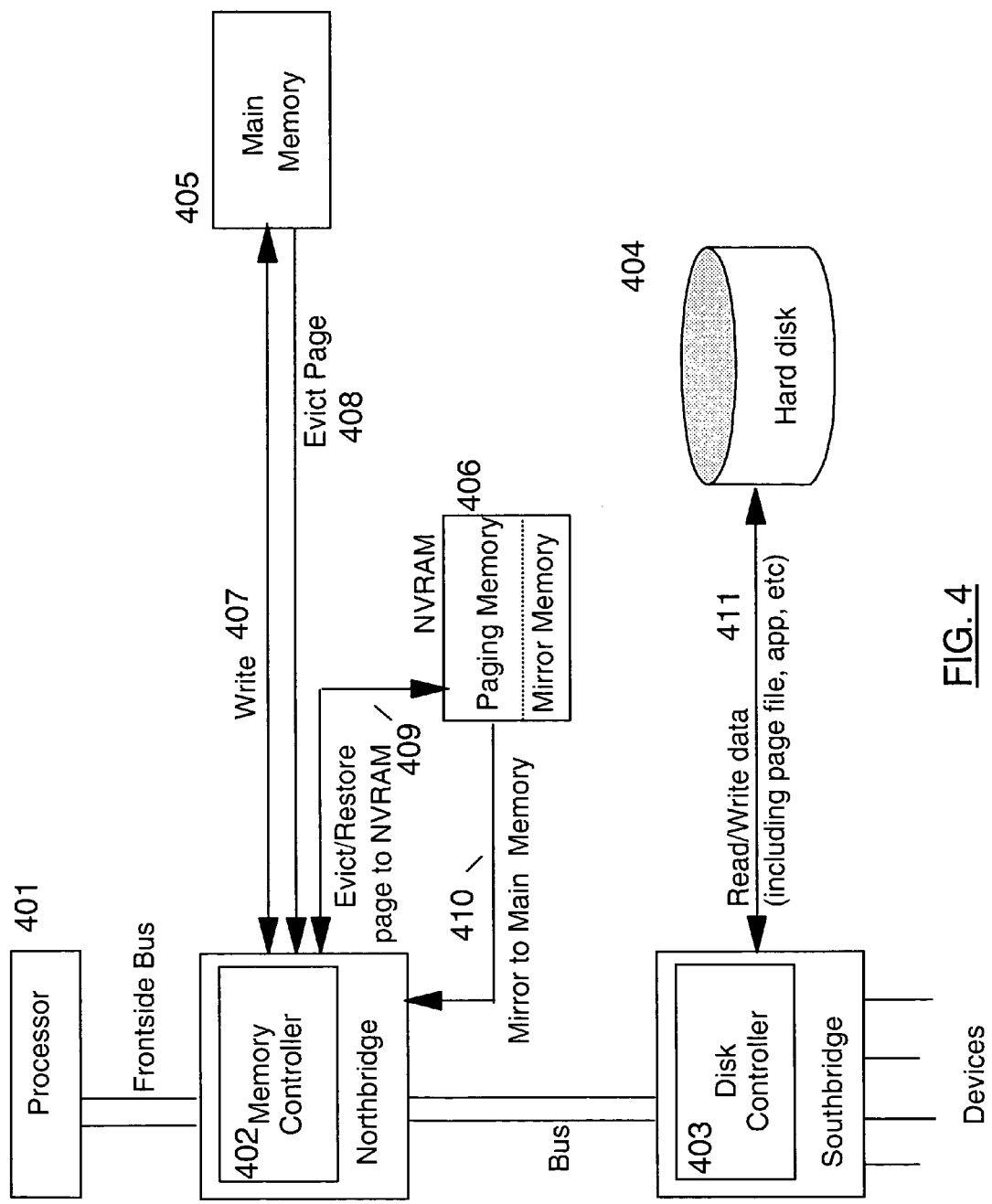
FIG. 4 is a diagram depicting a physical data path a page follows.

FIG. 4 illustrates the page replacement strategy in terms of the physical connections between components of a computer system. As the processor operates, data is loaded into pages stored in main memory 405 until it has sufficient data in main memory to operate. At some time, a new page is required that is not in main memory. A page in main memory 405 is selected for eviction and is sent to the non-volatile memory bank 406 following the traditional page eviction path 408 to the memory controller 402 to the additional eviction path 409. If the non-volatile memory bank 406 is full, a page is selected for eviction from the non-volatile memory 406 to the hard disk 404 and sent via the eviction path 409 to the disk controller 403 where it is stored in the hard disk 404. The evicted page is stored in the non-volatile memory at the vacated position. Restoring a page from the hard disk 404 transports the page to the hard disk controller 403, to the memory controller 402 and finally to main memory 405. Restoring a page from the non-volatile memory bank 406 transports the page 409 to the memory controller 402 and finally to main memory 405.

Figure 5:
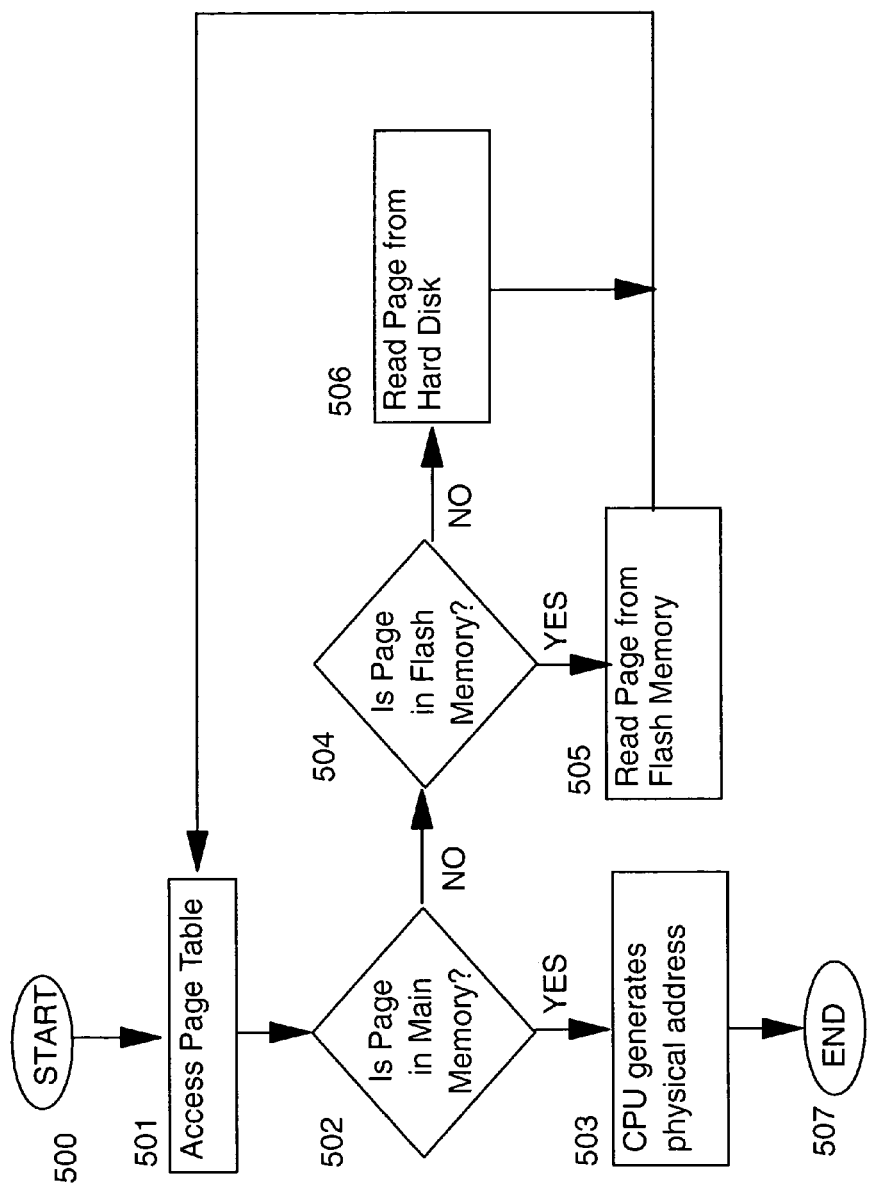
FIG. 5 is a diagram depicting the page fault process.

FIG. 5 illustrates the overall page replacement strategy. The START 500 and END 507 steps are convenience items and are not related to a physical component of the invention. The page process beings by accessing the page table to determine where the page is located 501. The system then determines whether the page is in main memory 501. If YES, then the processor generates the physical memory address of the page 503 and the process ends 507. If NO, the system determines whether or not the page is in nonvolatile memory (NVRAM) 504. If YES, then the page is read from NVRAM and placed in to main memory 505 using the process illustrated in FIG. 6. Then, the page table is read again 501 and the system determines whether the page is in main memory 502. At this point the page is guaranteed to find the page in main memory at this point so the processor generates the physical address of the page 503 and the process ends 507. If NO, then the page is read from the hard disk drive and placed in to main memory 506. Then, the page table is read again 501 and the system determines whether the page is in memory. At this point the page is guaranteed to find the page in main memory at this point so the processor generates the physical address of the page 503 and the process ends 507.

Figure 6:
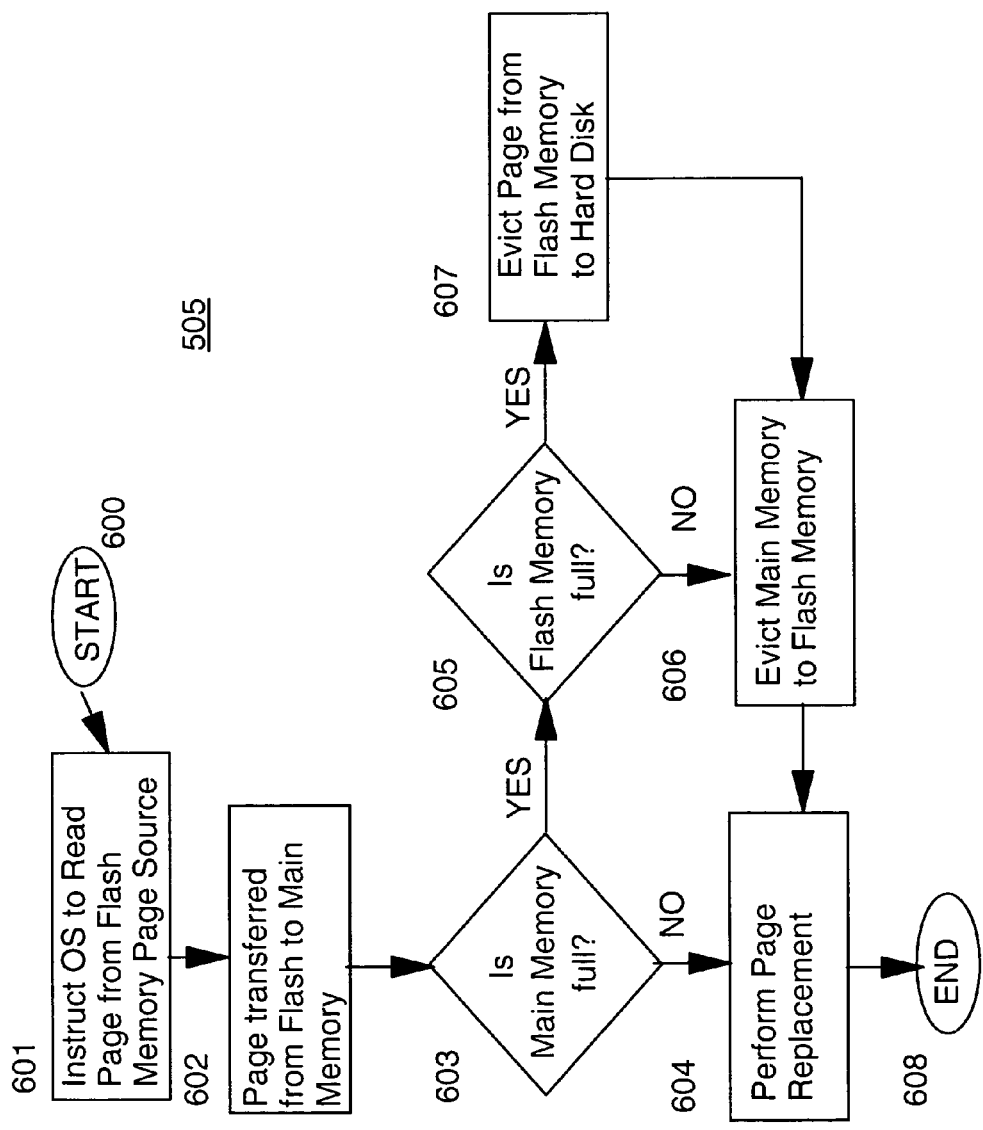
FIG. 6 is a diagram depicting the process of reading a page from nonvolatile memory.

FIG. 6 illustrates the steps taken to read a page from non-volatile memory (NVRAM) in to main memory. The START 600 and END 608 steps are convenience items and are not related to a physical component of the invention. The page replacement process begins when the operating system instructs the NVRAM to read the requested page from the page file 601. The page is then read from the NVRAM into a temporary location in main memory 602 before it is placed in main memory for use by the system. Next, the operating system determines whether or not main memory is full 603. If NO, then the newly read page is transferred from the temporary memory location to its permanent location in main memory 604 and the process ends 608. If YES, then the operating system determines whether or not the NVRAM is full 605. If NO, then a page is selected from main memory using predetermined criteria (FIFO, LRU and the like) and copied to the NVRAM 606. The page read from the NVRAM in 601 is then transferred from its temporary location in main memory to its permanent location in main memory 604 and the process ends 608. If YES, then a page is selected from the NVRAM using predetermined criteria and copied to the hard disk 607. Then, a page is selected from main memory using predetermined criteria and copied to the NVRAM 606. Finally, the page read from the NVRAM in 601 is transferred from its temporary location in main memory to its permanent location in main memory 604 and the process ends 608.

Figure 7:
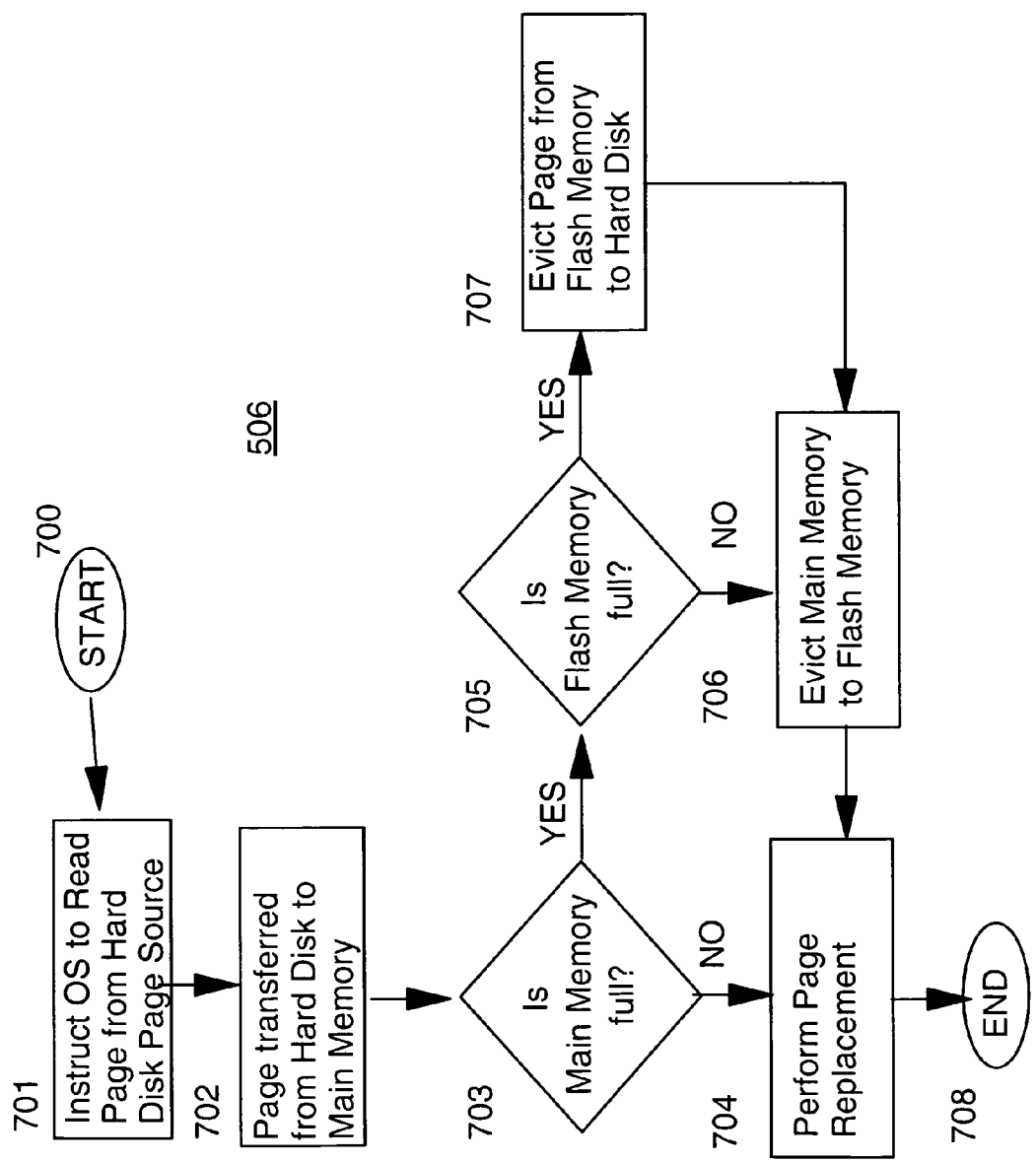
FIG. 7 is a diagram depicting the process of reading a page from a hard disk drive.

FIG. 7 illustrates the steps taken to read a page from the hard disk drive into main memory. The START 700 and END 708 steps are convenience items and are not related to a physical component of the invention. The page replacement process begins when the operating system instructs the hard disk to read the requested page from the page file 701. The page is then read from the hard disk into a temporary location in main memory 702 before it is placed in main memory for use by the system. Next, the operating system determines whether or not main memory is full 703. If NO, then the newly read page is transferred from the temporary memory location to its permanent location in main memory 704 and the process ends 708. If YES, then the operating system determines whether or not the NVRAM is full 705. If NO, then a page is selected from main memory using some predetermined criteria and copied to the nonvolatile memory (NVRAM) 706. The page read from the hard disk in 701 is then transferred from its temporary location in main memory to its permanent location in main memory 704 and the process ends 708. If YES, then a page is selected from NVRAM using some predetermined criteria and copied to the hard disk 707. Then, a page is selected from main memory using some predetermined criteria and copied to NVRAM 706. Finally, the page read from the hard disk in 701 is transferred from its temporary location in main memory to its permanent location in main memory 704 and the process ends 708.

An important optimization, common to virtual memory systems, is made during the transfer of pages between main memory and page files. If a page has not been marked "modified," then only the directory tracking the physical location of the page must be updated to reflect its move out of main memory in to a page file. In the context of this invention when a page is evicted from main memory to NVRAM, or from NVRAM to the hard disk it is first checked for modification. If the page has not been modified and has previously been stored in NVRAM page file or the hard disk page file then only the page's location must be updated in the page table. If the page has indeed been modified then the page must be copied to the destination page file NVRAM or hard disk) as well as its location in the page table be updated. U.S. Pat. No. 5,778,443: "Method and apparatus for conserving power and system resources in a computer system employing a virtual memory" discusses an example method for handling modified pages well known in the art.

This invention has other benefits in addition to increased performance when the system must page data in and out of main memory. First, in a mobile device it is not always possible to increase the total amount of main memory of the device. Increasing the capacity of main memory also increases the amount of power required to operate the device, reducing the expected usage time while on battery power. Non-volatile memory uses power only when it is being accessed in a read or write operation. Another consequence of the additional power is that more heat must be dissipated from the memory chips through the device, making it impractical or impossible to package in its original form factor. Densely packed blade computer systems can also benefit from this invention. In a blade computer system, power and heat dissipation are also important points of consideration. As in a mobile device additional main memory requires continuous power and dissipates more heat than a system with less main memory. Adding a non-volatile memory bank for paging allows this type of system to realize a performance increase without being constrained by heat and power.

Another benefit is that a blade computer system with non-volatile memory allows recently used data to be kept closer to where it is needed. Often in a blade computer system, hard disks are located across a shared medium, either a data bus or network connection. If the blade computer system uses the hard disk to stored discarded pages too frequently, the entire system will suffer due to the excessive use of the shared medium. Finally, main memory is generally more expensive than non-volatile memory because main memory must be very fast. Because paging is an inherently slow operation, using slower, less costly non-volatile memory is advantageous in lieu of either adding more main memory or using the slower hard disk paging mechanism.

In an optional implementation, the NVRAM is pluggable and can be provided as an optional, portable media.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

While the preferred embodiment of the invention has been illustrated and described herein, it is to be understood that the invention is not limited to the precise construction herein disclosed, and the right is "reserved" to all changes and modifications coming within the scope of the invention as defined in the appended claims.

What is claimed is:

1. A computer implemented method for paging data, the method comprising the steps of:
    an operating system page manager mapping pages of virtual memory of a permanent store to corresponding memory pages of a main memory whereby a plurality of pages of data of said permanent store are available to programs of a processor in said corresponding memory pages, said main memory consisting of a plurality of memory pages of data;
    determining that a first page of data of said plurality of memory pages of data is to be evicted from the main memory of a computer system;
    responsive to said determining, evicting the first page of data from the main memory;
    storing the evicted first page in a first paging store, the first paging store being a separate physical storage from said main memory and said permanent store;
    responsive to evicting a second page of data from the first paging store, storing the evicted second page in a second store, said permanent store comprising said second store, the second store being a separate physical storage from said first paging store and said main memory; and
    responsive to a request to move a third page of data to the main memory, performing the steps comprising:
        responsive to the third page of data being available in the first paging store, loading the third page of data into the main memory from said first paging store;
        responsive to the third page of data being not available in the first paging store, loading the third page of data into the main memory directly from the second store without loading said third page of data into said first paging store; and
        the operating system determining from an entry in a page table, whether the third page of data is in the first paging store or not in the first paging store, wherein the determining from the entry step comprising the operating system performing the loading the third page to memory from the determined first paging store or the second store;
    wherein each entry in the page table comprises a first field capable of indicating a corresponding page is in the first paging store, a second field capable of indicating a corresponding page is in the second store and an indicator capable of indicating a corresponding page has been modified, wherein the operating system determines that the page is in main memory, the first paging store or the second store based on the entry in the page table.

2. The method according to claim 1, wherein the first paging store is a non-volatile store consisting of any one of a nonvolatile random access memory (NVRAM) a hard disk, a CD, a DVD or a magnetic tape.

3. The method according to claim 1, wherein the first paging store is a nonvolatile random access memory (NVRAM) and the second store is a mechanically actuated storage device comprising any one of a hard disk, a CD, a DVD or a magnetic tape.

4. The method according to claim 1, comprising the further step of determining that the second page of data in the first paging store is to be evicted from the first paging store to make room in the first paging store for the first page of data being evicted from the main memory.

5. The method according to claim 1, comprising the further steps of:
- determining that a fourth page of data is to be evicted directly to the second store;
- evicting the fourth page of data from the main memory; and
- storing the fourth page of data in the second store directly from said main memory without storing the fourth page in the first paging store.

6. The method according to claim 1, wherein the determining step comprises:
- responsive to determining to discard the evicted first page of data, discarding the evicted first page of data ;
- responsive to determining to store the evicted first page of data in the first paging store, storing the evicted page of data in the first paging store; and
- responsive to determining to store the evicted first page of data in the second store, storing the evicted first page of data in the second store directly from said main memory without storing the first page in the first paging store.

7. The method according to claim 1, wherein the determining step comprises:
- responsive to determining to discard the evicted second page of data, discarding the evicted second page; or
- responsive to determining to store the evicted second page of data in the second store, storing the evicted second page of data in said second store.

8. The method according to claim 1, wherein the determining step comprises any one of the further steps consisting of:
- determining whether the first page has been modified since it was loaded from the second store;
- based on the first page being determined to have been unmodified, determining to discard the evicted second page of data; and
- based on the first page being determined to have been modified, determining to store the evicted second page of data in the second store.

9. The method according to claim 1, wherein the determining step comprises the further step of determining to evict the second page from the first paging store according to any one of a Least Recently Used algorithm (LRU), a First-In-First-Out algorithm (FIFO) or a hashing algorithm.

10. The method according to claim 1, wherein the first paging store is NVRAM, comprising the further step of:
- based on a power-down event being detected, evicting a plurality of pages of data from the main memory to the NVRAM first paging store; and
- based on the plurality of pages of data having been evicted, completing the power-down event.

11. The method according to claim 10, comprising the further step of:
- based on a power-up event being detected, loading a plurality of pages of data from the NVRAM first paging store to the main memory; and
- based on the plurality of pages of data having been loaded, completing the power-up event.

* * * * *